W. G. CANION.
AEROPLANE.
APPLICATION FILED JUNE 21, 1913.
1,112,260.
Patented Sept. 29, 1914.
6 SHEETS—SHEET 1.
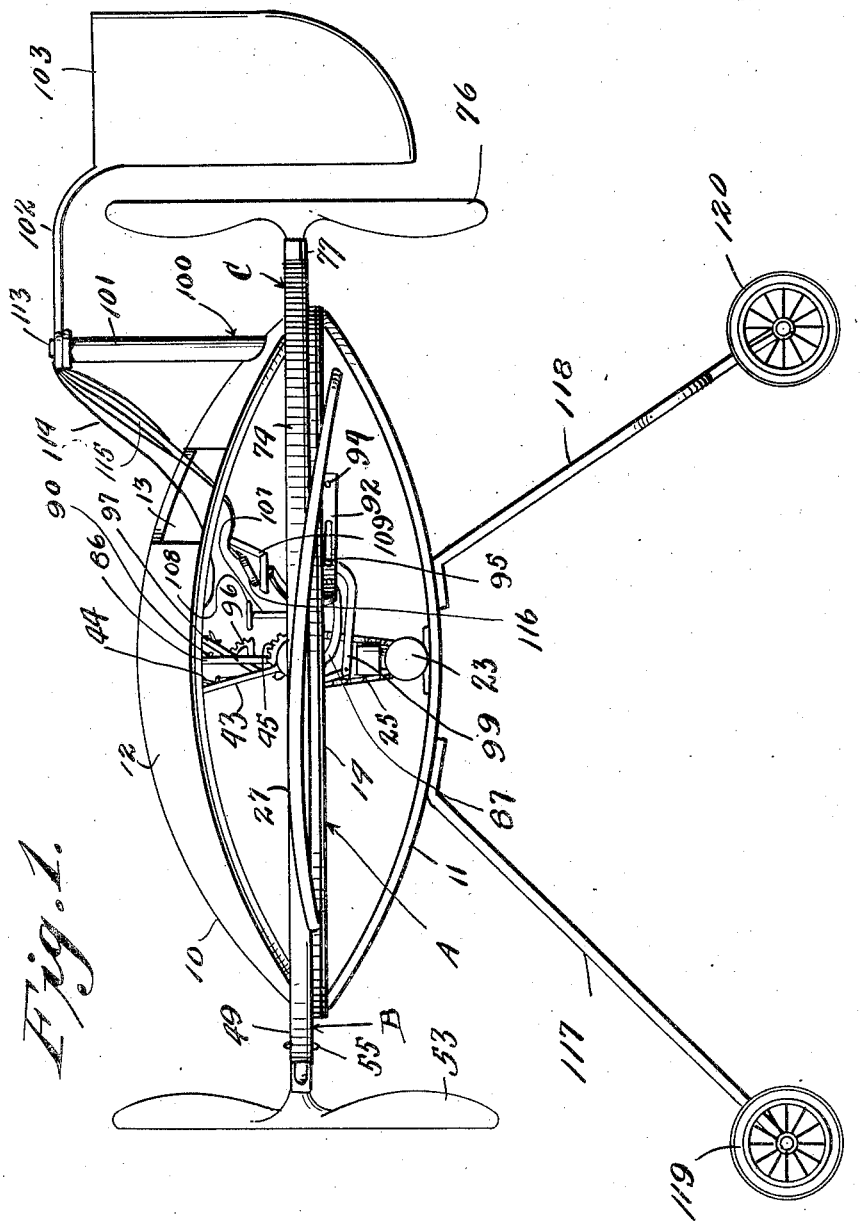
Witnesses
J. Mac Carter
Henry T. Bright
Inventor
W. G. Canion
By Chandler & Chandler
Attorneys.

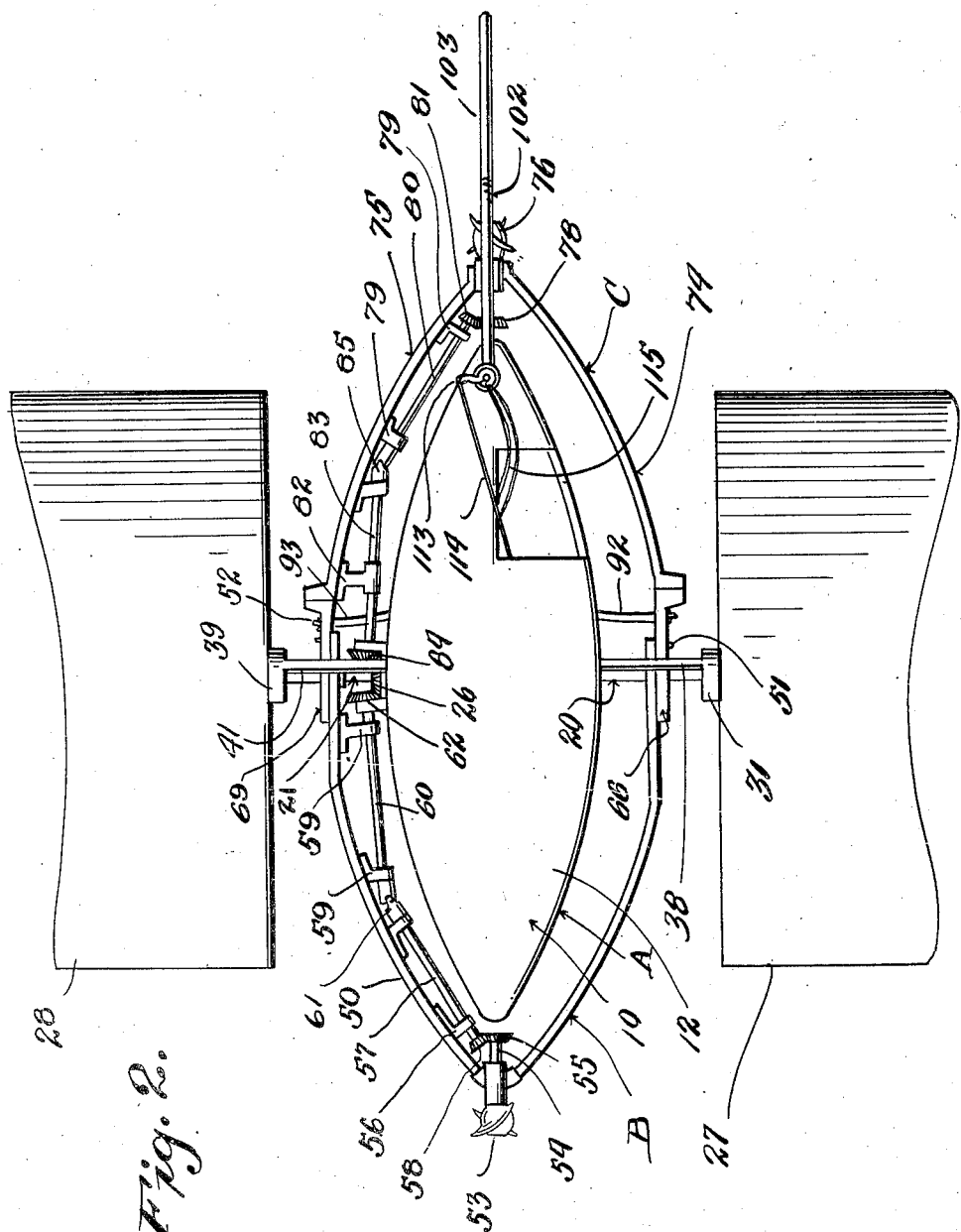

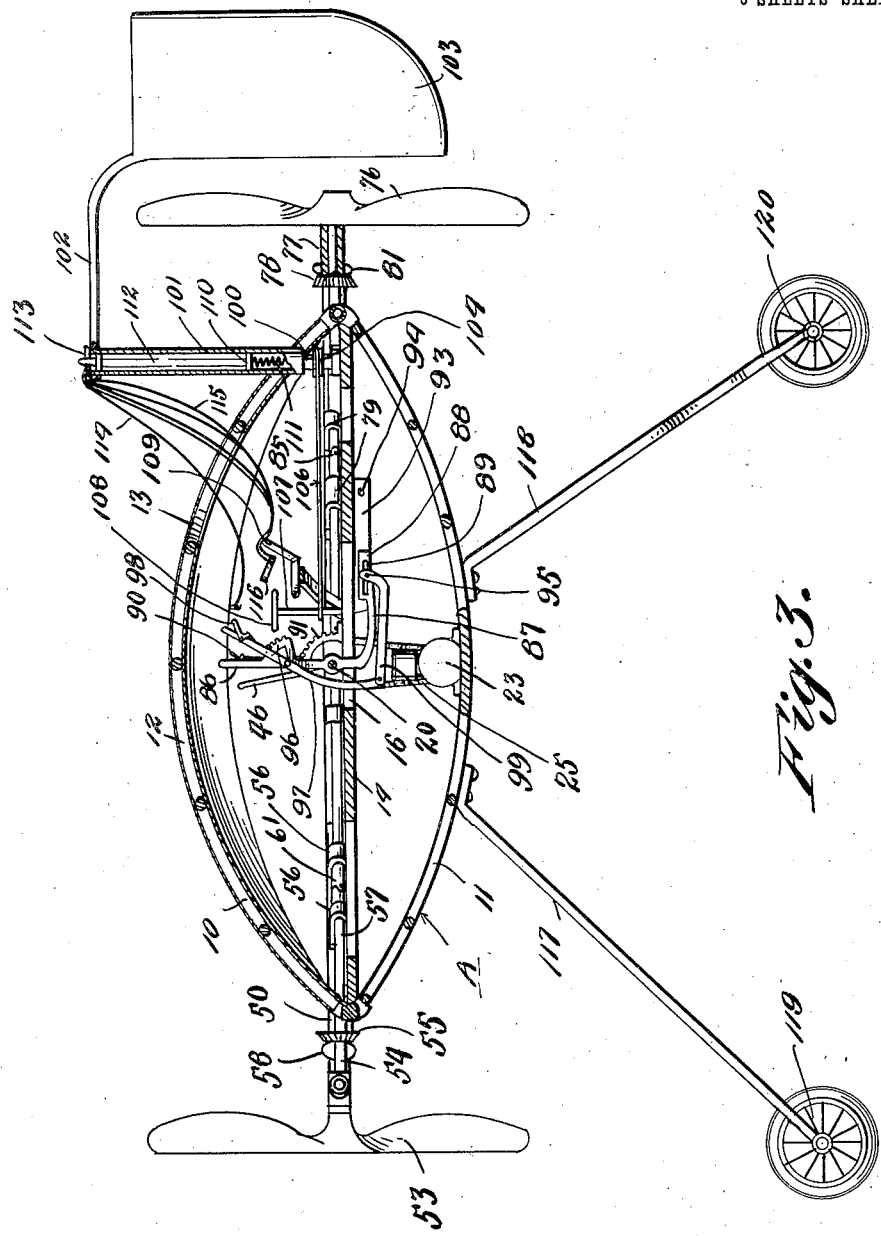

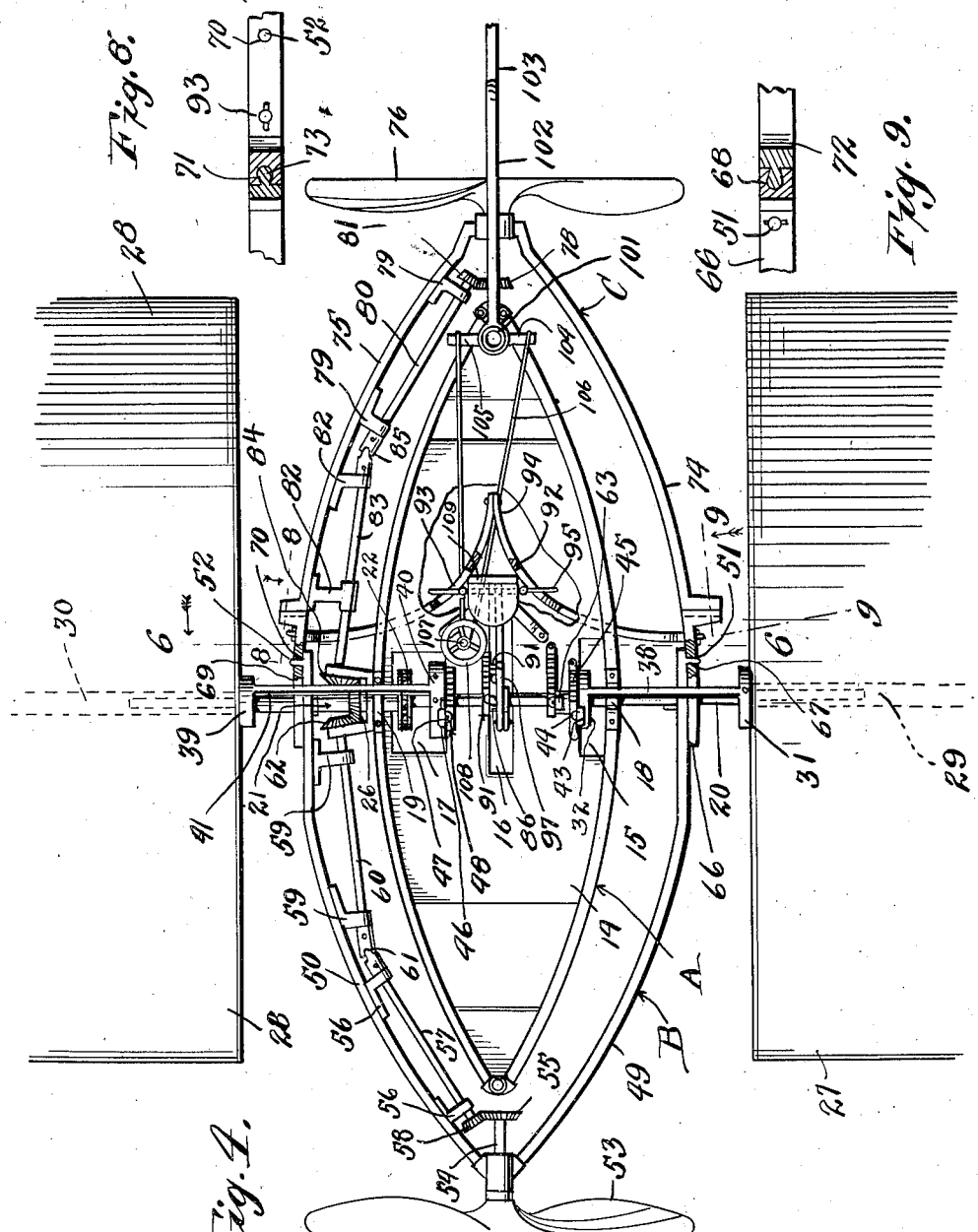

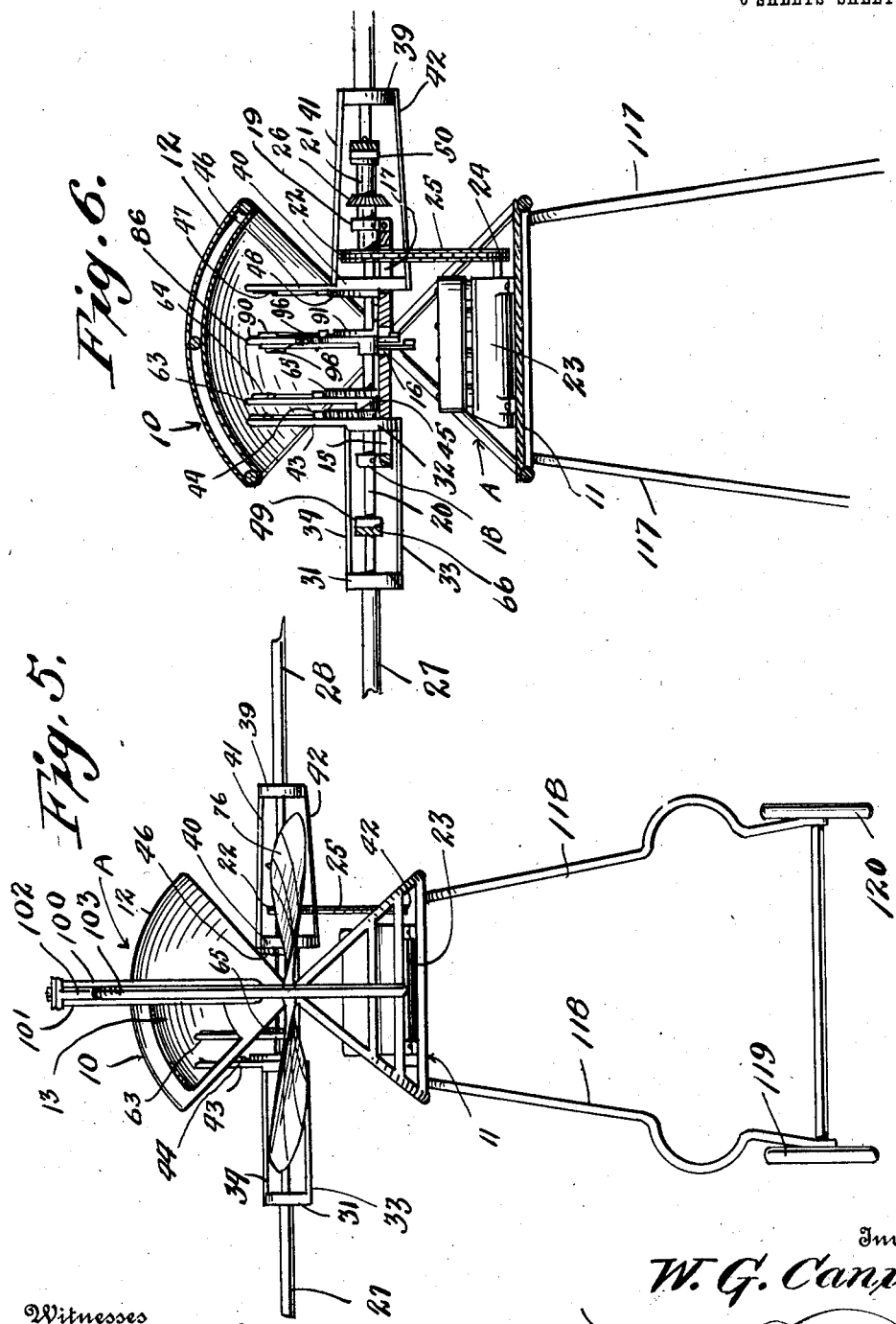

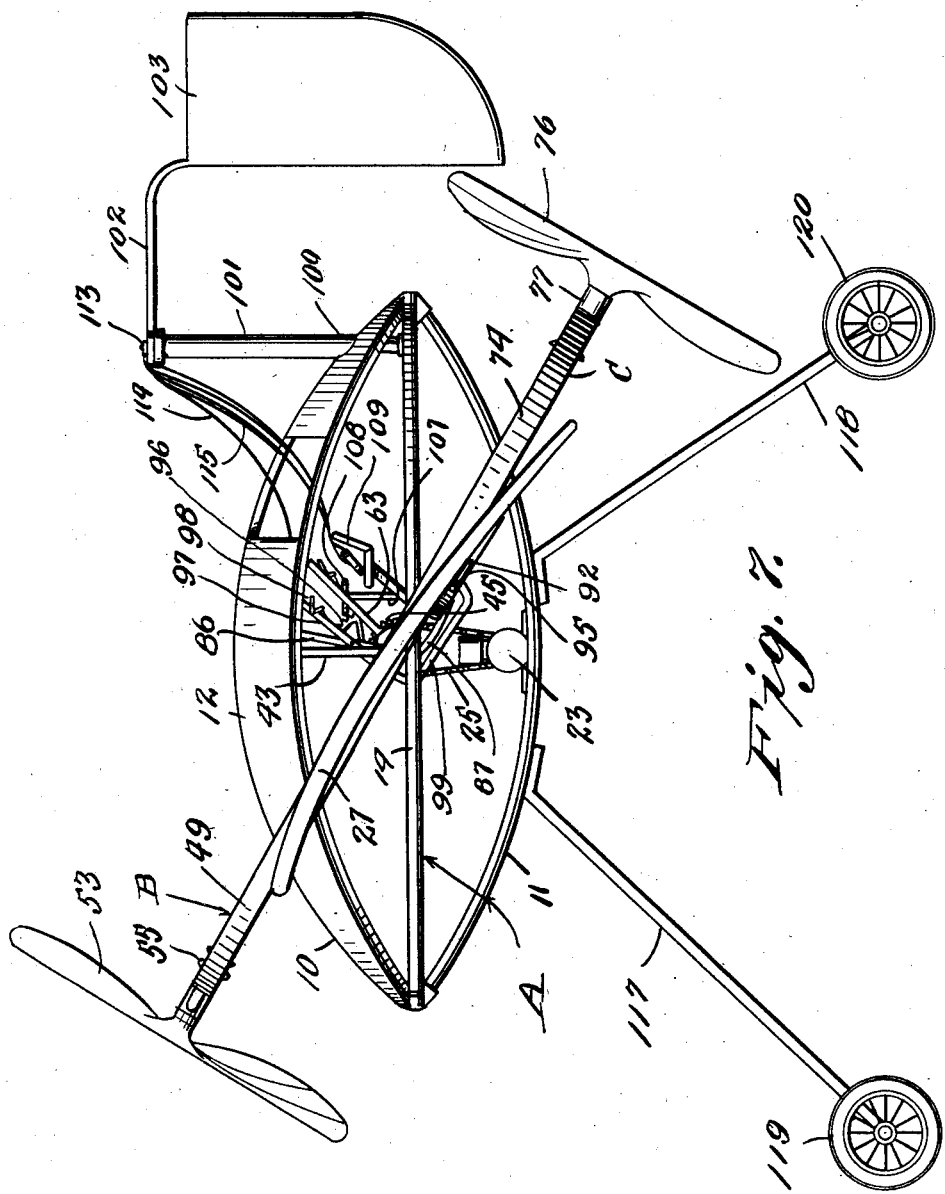

UNITED STATES PATENT OFFICE.

WILLIAM G. CANION, OF EL PASO, TEXAS.

AEROPLANE.

1,112,260.

Specification of Letters Patent. Patented Sept. 29, 1914.

Application filed June 21, 1913. Serial No. 775,022.

*To all whom it may concern:*

Be it known that I, WILLIAM G. CANION, a citizen of the United States, residing at El Paso, in the county of El Paso, State of Texas, have invented certain new and useful Improvements in Aeroplanes; and I do hereby declare the following to be a full, clear, and exact description of the invention, such as will enable others skilled in the art to which it appertains to make and use the same.

This invention relates to aeroplanes.

The object of the invention resides in the provision of an aeroplane which embodies an improved construction of means whereby the equilibrium of the aeroplane may be controlled with certainty by the operator when the device is subjected to atmospheric conditions tending to destroy the equilibrium and stability of same.

A further object of the invention resides in the provision of an aeroplane which includes means for positively assuring the safety of the operator in the event same should become uncontrollable from any cause whatever.

A still further object of the invention resides in the provision of an aeroplane which embodies front and rear propellers arranged to pull and push respectively and improved means under the control of the operator for selectively swinging said propellers so as to be disposed at different angles of incidence, such operation of the propellers enhancing the operator's control for the purpose of rising and descending.

Still another object of the invention resides in the provision of an aeroplane which embodies a main frame and planes supported at each side of the main frame together with improved means for rotating said planes selectively whereby same may be made to present different angles of incidence for the purpose of maintaining the device balanced or on even keel.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of an aeroplane constructed in accordance with the invention; Fig. 2, a top plan view thereof; Fig. 3, a vertical longitudinal section of the aeroplane; Fig. 4, an enlarged plan view with the cover carried by the main frame removed; Fig. 5, a rear view of the device; Fig. 6, a cross sectional view of same, and Fig. 7, a side elevation of the aeroplane with the propellers and planes adjusted to effect the rapid ascent of same. Fig. 8, a section on the line 8—8 of Fig. 4, and Fig. 9, a section on the line 9—9 of Fig. 4.

Referring to the drawings the aeroplane is shown as comprising a main frame A formed of oppositely curved upper and lower sections 10 and 11 respectively, said upper section of the main frame being provided with a cover 12 having an opening 13, the purpose of which latter will presently appear. Supported by the main frame A at the junction of the sections 10 and 11 is a platform 14 provided with openings 15, 16 and 17 arranged centrally thereof, the opening 16 being disposed between the openings 15 and 17. Journaled in bearings 18 and 19 mounted on the platform 14 is a transverse shaft 20. Rotatably mounted on the transverse shaft 20 adjacent the opening 17 is a sleeve 21 and fixed on the inner end of this sleeve is a sprocket wheel 22. Mounted upon the section 11 of the frame A is a motor 23 which has fixed on the crank shaft thereof a sprocket wheel 24 operatively connected to the sprocket wheel 22 by means of a sprocket chain 25 and whereby the operation of the motor 23 will effect the rotation of the shaft 21. Fixed on the outer end of the sleeve 21 is a beveled gear 26 for a purpose that will presently appear. Disposed on opposite sides of the frame A are planes 27 and 28 which have included therein transverse rods 29 and 30 respectively. Fixed on the rod 29 adjacent the main frame A is a disk 31, while a corresponding disk 32 is loosely mounted on the shaft 20 and operates in the opening 15. The disks 31 and 32 are connected by bars 33 and 34 whereby the rotation of one of said disks will produce a corresponding rotation of the other.

The shaft 20 and rod 29 are disposed in longitudinal alinement, one end of the shaft 20 being rotatably mounted in the adjacent end of the rod 29. The rod 30 is also disposed in longitudinal alinement with the shaft 20 which latter has one end rotatably mounted in the adjacent end of the rod 30. Fixed on the end of the rod 30 adjacent the frame A is a disk 39, while another disk 40 is loosely mounted on the shaft 20 and operates in the opening 17. The disks 39 and 40 are connected together by bars 41 and 42 whereby said disks may be rotated in unison. Formed on the disk 32 is a lever extension 43 which carries a spring pawl 44 coöperating with a toothed segment 45 mounted on the platform 14. From this construction it will be apparent that by operating the lever extension 43 the disks 31 and 32 will be rotated and such rotation of said disks will in turn rotate the rod 29 and the plane 27 to dispose the latter at different angles of incidence to the atmosphere. Through the medium of the pawl 44 it will be obvious that the parts just referred to can be locked so as to maintain the plane 27 adjusted at a given angle of incidence to the atmosphere. Formed on the disk 40 is a lever extension 46 which carries a spring pawl 47, the latter coöperating with a toothed segment 48 mounted on the platform 14. By this construction it will be apparent that upon the rotation of the disk 40 through the medium of the lever extension 46 the rod 30 will be rotated to dispose the plane 28 at different angles of incidence to the atmosphere and that said plane can be locked in a desired adjustment through the medium of the pawl 47 and toothed segment 48.

Fixed upon the shaft 20 and disposed substantially in embracing relation to the platform 14 are the arms 49 and 50 of a V-shaped frame B the apex of which is directed forwardly of the aeroplane. The free ends of the arms 49 and 50 extend rearwardly of the shaft 20 and are provided respectively with laterally directed fingers 51 and 52 for a purpose that will presently appear. Rotatably mounted on the forward end of the frame B is a propeller 53 having a rearwardly directed axial extension 54 upon which is fixed a beveled gear 55. Rotatably mounted in bearings 56 carried by the arm 50 is a shaft 57 which has fixed thereon a beveled gear 58 meshing with the gear 55. Also journaled in bearings 59 carried by the arm 50 is a shaft 60 the forward end of which is connected to the rear end of the shaft 57 by a universal joint 61, while the rear end of said shaft 60 has fixed thereon a beveled gear 62 which meshes with the beveled gear 26 fixed on the sleeve 21. Fixed on the shaft 20 is a lever 63 which carries a spring pawl 64 coöperating with a toothed segment 65 mounted on the platform 14. By this construction it will be apparent that by operating the lever 63 the forward end of the frame B may be raised and lowered to dispose the propeller 53 at different angles of incidence to the atmosphere. Loosely mounted on the shaft 20 adjacent the outer side of the arm 49 is a bar 66 provided with an opening 67 adapted to detachably receive the finger 51. The rear end of the bar 66 is provided with a transverse dove tail groove 68 for a purpose that will presently appear. Loosely mounted on the shaft 20 adjacent the outer side of the arm 50 is a bar 69 which is provided with an opening 70 for detachably receiving the finger 52. The rear end of this bar 69 is also provided with a transverse dove tail groove 71 for a purpose that will presently appear. Slidably engaged in the grooves 68 and 71 are ribs 72 and 73 respectively formed on the inner ends of respective arms 74 and 75 of a V-shaped frame C. Rotatably mounted on the frame C is a propeller 76 provided with an axial extension 77 upon which is fixed a beveled gear 78. Journaled in brackets 79 carried by the arms 75 is a shaft 80 which has fixed on one end thereof a beveled gear 81 which meshes with the beveled gear 78. Also journaled in brackets 82 carried by the arms 75 is a shaft 83 one end of which has fixed thereon a beveled gear 84 meshing with the beveled gear 26 while the other end thereof is connected to the adjacent end of the shaft 80 by a universal joint 85.

Loosely mounted on the shaft 20 and operating in the opening 16 is a lever 86 the lower end of which is provided with a rearward extension 87 having an enlarged portion 88 formed with a slot 89. This lever 86 carries a spring pawl 90 which coöperates with a toothed segment 91 mounted on the platform 14 for the purpose of locking said lever 86 against pivotal movement. Disposed beneath the platform 14 at the rear of the shaft 20 are spreader arms 92 and 93. The rear ends of the arms 92 and 93 are connected together as at 94, while the forward ends of said arms are secured respectively to the rear ends of the bars 67 and 69. Slidably engaged through openings in respective arms 92 and 93 is a rod 95 for a purpose that will presently appear. Formed integral with the lever 86 above the shaft 20 is a rearwardly extending toothed segment 96 and pivoted upon said lever 86 is another lever 97 which carries a spring pawl 98 adapted for coöperation with the toothed segment 96 to lock the lever 97 against pivotal movement. Pivotally connected to the lower end of the lever 97 is one end of a link 99, the other end of which is pivotally engaged with the rod 95, which latter is also slidably engaged through the slot 89 in the arm 87 of the lever 86. By this construction it will be apparent that with the fingers 51 and 52 engaged in the openings 67 and 70 respectively as shown in Fig. 4 should the lever 63 be operated rearwardly the frames B and C will be simultaneously moved to the position shown in Fig. 7 so as to alter the angle of incidence of the propellers 53 and 76. If it is desired to maintain the frame C and propeller 76 in the position shown in Fig. 1 and elevate the free end of the frame B it is only necessary to disengage the pawl 98 from the segment 96 and move the upper end of the lever 97 rearwardly. This movement of the lever 97 will draw the link 99 and rod 95 forwardly so as to spread the forward ends of the arms 92 and 93. The spreading of the forward ends of the arms 92 and 93 will move the bars 67 and 69 outwardly on the shaft 20 and disengage said bars from the fingers 51 and 52 respectively. After the fingers 51 and 52 have been disengaged from the bars 67 and 69 respectively the pawl 98 is again locked with the segment 96 and as the lever 86 is also locked against rotation it will be apparent that the frame C will be supported against movement on the shaft 20. Should the lever 63 then be moved rearwardly it will be apparent that the free end of the frame B and the propeller 53 will be elevated so as to dispose the latter at a different angle of incidence. Should it be desired to also swing the frame C it is only necessary to disengage the pawl 90 from the segment 91 and operate the lever 86.

Mounted upon the rear end of the platform 14 is a rotatable vertical steering column 100 which includes a tubular upper portion 101. Secured to the upper end of the tubular portion 101 is an arm 102 which carries a rudder 103 disposed at the rear of the propeller 76. Fixed on the lower end of the column 100 are diametrically opposite lateral arms 104 and 105 which have connected thereto the terminals of a tiller cable 106. This tiller cable 106 is engaged with a steering shaft 107 mounted on the platform 14 just at the rear of the shaft 20 and carrying the usual steering wheel 108. Also mounted upon the platform 14 in proximity to the steering wheel 108 is an operator's seat 109. Disposed in the tubular portion 101 of the steering column is a follower 110 and interposed between the follower 110 and the bottom of the tubular portion 101 is a spring 111 which constantly tends to force said follower through the open upper end of said tubular portion. Also engaged in the bore of the tubular portion 101 above the follower 110 is a parachute body 112 which is normally held within the tubular portion 101 by a pivoted latch 113 which is operated to release position by a cable 114 disposed to within convenient reach of the operator. Attached to the parachute body 112 are the usual cables 115 connected at their outer ends to a belt 116 adapted to be secured around the body of the operator.

In the event the aeroplane should become uncontrollable it is only necessary for the operator to pull the cable 114 when the latch 113 will be moved to release position and the parachute body 112 ejected by the spring 111 from the tubular portion 101 of the steering column. The parachute body thus ejected will spread and as the descent of the aeroplane becomes rapid the resistance of the parachute will draw the operator through the opening 13 of the top 12 and eventually land him safely upon the ground.

Depending from the bottom section 11 of the main frame A are front and rear bracket frames 117 and 118 upon which are journaled respectively the usual traction wheels 119 and 120 which serve to support the aeroplane at all times when the latter is not in flight.

What I claim is:—

1. In an aeroplane, a frame, a transverse shaft rotatably mounted on said frame, a plane supported by said transverse shaft, a second frame including interlocked sections one of which is fixed on said shaft and the other loosely mounted thereon, propellers mounted on said sections respectively, and means for disengaging the interlocking sections of the second named frame whereby the rotation of said shaft will swing one of said sections to dispose the propeller carried thereby at different angles of incidence.

2. In an aeroplane, a frame, a transverse shaft rotatably mounted on said frame, a plane supported by said transverse shaft, a second frame including interlocked sections one of which is fixed on said shaft and the other loosely mounted thereon, propellers mounted on said sections respectively, and lever operated means for disengaging the interlocking sections of the second named frame whereby the rotation of said shaft will swing one of said sections to dispose the propeller carried thereby at different angles of incidence.

3. In an aeroplane, a frame, a transverse shaft rotatably mounted on said frame, a plane supported by said transverse shaft, a second frame including interlocked sections one of which is fixed on said shaft and the other loosely mounted thereon, propellers mounted on said sections respectively, and means for locking the other section of the second named frame against pivotal movement about said shaft.

4. In an aeroplane, a frame, a transverse shaft rotatably mounted on said frame, a plane supported by said shaft, a second frame including interlocked sections one of which is fixed on said shaft and the other loosely mounted thereon, propellers mounted on said sections respectively, means for locking the other section of the second named frame against pivotal movement about said shaft, and lever operated means for releasing said last named sections for pivotal movement about said shaft.

In testimony whereof, I affix my signature, in the presence of two witnesses.

WILLIAM G. CANION.

Witnesses:
E. HURST,
A. ELLISON.